(12) United States Patent
Beals

(10) Patent No.: US 9,996,066 B2
(45) Date of Patent: Jun. 12, 2018

(54) SYSTEM AND METHOD FOR HVAC HEALTH MONITORING USING A TELEVISION RECEIVER

(71) Applicant: Echostar Technologies L.L.C., Englewood, CO (US)

(72) Inventor: William Michael Beals, Englewood, CO (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 204 days.

(21) Appl. No.: 14/952,580

(22) Filed: Nov. 25, 2015

(65) Prior Publication Data

US 2017/0146964 A1    May 25, 2017

(51) Int. Cl.
*G05B 19/048*   (2006.01)
*G05B 15/02*   (2006.01)

(52) U.S. Cl.
CPC .... *G05B 15/02* (2013.01); *G05B 2219/24015* (2013.01); *G05B 2219/2614* (2013.01); *G05B 2219/2642* (2013.01)

(58) Field of Classification Search
None
See application file for complete search history.

(56) References Cited

U.S. PATENT DOCUMENTS 4,127,966 A    12/1978    Schmidt
4,386,436 A    5/1983    Kocher et al.
4,581,606 A    4/1986    Mallory
4,694,607 A    9/1987    Ishida et al.
(Continued)

FOREIGN PATENT DOCUMENTS

CA    2 267 988 A1    4/1998
CN    105814555 A    7/2016
(Continued)

OTHER PUBLICATIONS

'Plug-In Carbon Monoxide & Natural Gas Alarm with Backup Battery Protection', Universal Security, 2011.*
(Continued)

*Primary Examiner* — Mohammad Ali
*Assistant Examiner* — Bernard G Lindsay
(74) *Attorney, Agent, or Firm* — Kilpatrick Townsend & Stockton LLP

(57) ABSTRACT

Identifying errors with home HVAC systems and notifying the homeowner of the error and potential remedial steps can be useful. In some embodiments, a method is provided including receiving, at an electronic device, a temperature value and an airflow value from sensors located at a vent grate of the HVAC system. A temperature delta value can be calculated using the temperature value and an ambient temperature value. The temperature delta value can be compared with predetermined temperature delta threshold value. The airflow value can be compared with predetermined airflow threshold value. Based on comparing the temperature delta value step and/or the comparing the airflow value step, an error with the HVAC system can be identified. A notification of the error and subsequent potential remedial steps can be sent from the electronic device to the homeowner.

9 Claims, 9 Drawing Sheets

(56) References Cited

U.S. PATENT DOCUMENTS

| | | |
|---|---|---|
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,111,517 A | 8/2000 | Atick et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,792,319 B1 | 9/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,237,141 B2 | 1/2016 | Logue et al. |
| 9,246,921 B1 | 1/2016 | Vlaminck et al. |
| 9,258,593 B1 | 2/2016 | Chen et al. |
| 9,286,482 B1 | 3/2016 | Dumont et al. |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,589,448 B1 | 3/2017 | Schneider et al. |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 9,772,612 B2 | 9/2017 | McCarthy et al. |
| 9,798,309 B2 | 10/2017 | Tirpak |
| 9,824,578 B2 | 11/2017 | Burton et al. |
| 9,838,736 B2 | 12/2017 | Smith et al. |
| 9,882,736 B2 | 1/2018 | Lett |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0154242 A1 | 8/2003 | Hayes et al. |
| 2003/0192600 A1 | 10/2003 | Ford |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |

(56) References Cited

U.S. PATENT DOCUMENTS

| | | |
|---|---|---|
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0115156 A1 | 6/2006 | Nakajima et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0186740 A1 | 8/2006 | Von Gunten |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0179053 A1 | 7/2008 | Kates |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1 | 3/2010 | Myllymaki |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |

(56) References Cited

U.S. PATENT DOCUMENTS

| | | |
|---|---|---|
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1* | 6/2013 | Zywicki ............... F24F 11/0086 700/276 |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1* | 8/2014 | Clayton ............... G05B 19/042 315/154 |
| 2014/0218517 A1 | 8/2014 | Kim et al. |
| 2014/0222634 A1* | 8/2014 | Gordon ............... G05B 19/0421 705/34 |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1 | 10/2014 | Ricci |
| 2014/0310075 A1 | 10/2014 | Ricci |
| 2014/0313014 A1 | 10/2014 | Huh et al. |
| 2014/0313032 A1 | 10/2014 | Sager et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemaulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1* | 9/2015 | Fadell ............... F24F 11/0012 236/1 C |
| 2015/0281824 A1 | 10/2015 | Nguyen et al. |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0041565 A1 | 2/2016 | Edwards |
| 2016/0047569 A1* | 2/2016 | Fadell ............... G05D 23/1902 236/1 C |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1 | 6/2016 | Peterson et al. |
| 2016/0191912 A1 | 6/2016 | Lea et al. |
| 2016/0191990 A1 | 6/2016 | McCarthy |
| 2016/0195856 A1 | 7/2016 | Spero |
| 2016/0196731 A1* | 7/2016 | Aich ............... G08B 25/08 340/539.17 |
| 2016/0203700 A1 | 7/2016 | Bruhn et al. |
| 2016/0234034 A1 | 8/2016 | Mahar et al. |
| 2016/0248598 A1 | 8/2016 | Lin et al. |
| 2016/0256485 A1 | 9/2016 | Wager et al. |
| 2016/0260135 A1 | 9/2016 | Zomet et al. |
| 2016/0285644 A1 | 9/2016 | Lu et al. |
| 2016/0286327 A1 | 9/2016 | Marten |
| 2016/0323548 A1 | 11/2016 | Khot et al. |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0065433 A1 | 1/2017 | Gould et al. |
| 2017/0041886 A1 | 2/2017 | Baker et al. |
| 2017/0048476 A1 | 2/2017 | Freiin von Kapri et al. |
| 2017/0051925 A1* | 2/2017 | Stefanski ............... F24D 19/1084 |
| 2017/0054615 A1 | 2/2017 | Wilson |
| 2017/0082987 A1 | 3/2017 | Reddy et al. |

(56) References Cited

U.S. PATENT DOCUMENTS

| | | | |
|---|---|---|---|
| 2017/0127124 A9 | 5/2017 | Wilson et al. |
| 2017/0168469 A1 | 6/2017 | Marten et al. |
| 2017/0176961 A1 | 6/2017 | Tirpak |
| 2017/0187993 A1 | 6/2017 | Martch et al. |
| 2017/0191693 A1 | 7/2017 | Bruhn et al. |
| 2017/0191695 A1 | 7/2017 | Bruhn et al. |
| 2017/0195130 A1 | 7/2017 | Landow et al. |

FOREIGN PATENT DOCUMENTS

| | | |
|---|---|---|
| EP | 2 736 027 A1 | 5/2014 |
| EP | 3 080 677 A1 | 10/2016 |
| EP | 3 080 710 A1 | 10/2016 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2011/149473 A1 | 12/2011 |
| WO | 2014/068556 A1 | 5/2014 |
| WO | 2015/179120 A1 | 11/2015 |
| WO | 2006/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2017/116533 A1 | 7/2017 |

OTHER PUBLICATIONS

"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.

Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.

Author Unknown, "App for Samsung Smart TV®," Crestron Electronics, Inc., accessed on Jul. 14, 2014, 3 pages. Retrieved from http://www.crestron.com/products/smart tv television apps/.

Author Unknown, "AllJoyn Onboarding Service Frameworks," Qualcomm Connected Experiences, Inc., accessed on Jul. 15, 2014, 9 pages. Retrieved from https://www.alljoyn.org.

"Do you want to know how to find water leaks? Use a Bravedo Water Alert Flow Monitor to find out!", Bravedo.com, accessed Dec. 16, 2014, 10 pages. Retrieved from http://bravedo.com/.

"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.

Fong A.C.M. et al, "Indoor air quality control for asthma patients using smart home technology," Consumer Electronics (ISCE), 2011 IEEE 15th International Symposium On, IEEE, Jun. 14, 2011, pp. 18-19, XP032007803, DOI: 10.1109/ISCE.2011.5973774, ISBN: 978-1-61284-843-3, Abstract and sections 3 and 4.

"International Building Code Excerpts, Updated with recent code changes that impact electromagnetic locks," Securitron, Assa Abloy, IBC/IFC 2007 Supplement and 2009, "Finally-some relief and clarification", 2 pages.Retrieved from: www.securitron.com/Other/.../New_IBC-IFC_Code_Language.pdf.

"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.

Lamonica, M., "CES 2010 Preview: Green comes in many colors," retrieved from CNET.com (http://ces.cnet.com/8301-31045_1-10420381-269.html), Dec. 22, 2009, 2 pages.

Robbins, Gordon, Deputy Chief, "Addison Fire Department Access Control Installation," 2006 International Fire Code, Section 1008.1.3.4, 4 pages.

Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.

"Ultrasonic Flow Meters," RS Hydro Ltd, accessed on Dec. 16, 2014, 3 pages. Retrieved from http://www.rshydro.co.uk/ultrasonic-flowmeter.shtml.

Wang et al., "Mixed Sound Event Verification on Wireless Sensor Network for Home Automation," IEEE Transactions on Industrial Informatics, vol. 10, No. 1, Feb. 2014, 10 pages.

International Search Report and Written Opinion for PCT/EP2011/051608 dated May 30, 2011, 13 pages.

International Preliminary Report on Patentability for PCT/EP2011/051608 dated Aug. 16, 2012, 8 pages.

International Search Report and Written Opinion for PCT/US2014/053876 dated Nov. 26, 2014, 8 pages.

International Search Report and Written Opinion for PCT/US2014/055441 dated Dec. 4, 2014, 10 pages.

International Search Report and Written Opinion for PCT/US2014/055476 dated Dec. 30, 2014, 10 pages.

International Search Report and Written Opinion for PCT/EP2015/070286 dated Nov. 5, 2015, 13 pages.

International Search Report and Written Opinion for PCT/GB2015/052544 dated Nov. 6, 2015, 10 pages.

International Search Report and Written Opinion for PCT/GB2015/052457 dated Nov. 13, 2015, 11 pages.

U.S. Appl. No. 14/470,352, filed Aug. 27, 2014 Non Final Office Action dated Nov. 20, 2015, 28 pages.

U.S. Appl. No. 12/700,310, filed Feb. 4, 2010, Office Action dated May 4, 2012, 15 pages.

U.S. Appl. No. 12/700,310, filed Feb. 4, 2010, Final Office Action dated Oct. 10, 2012, 16 pages.

U.S. Appl. No. 12/700,310, filed Feb. 4, 2010 Non-Final Office Action dated Apr. 1, 2013, 16 pages.

U.S. Appl. No. 12/700,310, filed Feb. 4, 2010 Non-Final Office Action dated Oct. 15, 2013, 15 pages.

U.S. Appl. No. 12/700,310, filed Feb. 4, 2010 Final Office Action dated Feb. 28, 2014, 17 pages.

U.S. Appl. No. 12/700,310, filed Feb. 4, 2010 Non-Final Office Action dated Aug. 14, 2014, 18 pages.

U.S. Appl. No. 12/700,310, filed Feb. 4, 2010 Non-Final Office Action dated Mar. 11, 2015, 35 pages.

U.S. Appl. No. 12/700,310, filed Feb. 4, 2010 Final Office Action dated Oct. 26, 2015, 19 pages.

U.S. Appl. No. 12/700,408, filed Feb. 4, 2010, Notice of Allowance dated Jul. 28, 2012, 8 pages.

U.S. Appl. No. 13/680,934, filed Nov. 19, 2012, Non-Final Office Action dated Oct. 2, 2013, 7 pages.

U.S. Appl. No. 13/680,934, filed Nov. 19, 2012, Final Office Action dated Feb. 10, 2014, 13 pages.

U.S. Appl. No. 13/680,934, filed Nov. 19, 2012, Notice of Allowance dated Apr. 30, 2014, 9 pages.

U.S. Appl. No. 13/680,934, filed Nov. 19, 2012, Notice of Allowance dated Jul. 25, 2014, 12 pages.

U.S. Appl. No. 14/107,132, filed Dec. 16, 2013, Non Final Office Action dated May 27, 2015, 26 pages.

U.S. Appl. No. 14/107,132, filed Dec. 16, 2013, Final Rejection dated Dec. 16, 2015, 32 pages.

U.S. Appl. No. 14/485,188, filed Sep. 12, 2014, Pre-Interview First Office Action dated Jul. 29, 2015, 20 pages.

U.S. Appl. No. 14/485,188, filed Sep. 12, 2014, Pre-Interview First Office Action dated Oct. 1, 2015, 10 pages.

International Search Report and Written Opinion for PCT/EP2015/073299 dated Jan. 4, 2016, 12 pages.

International Search Report and Written Opinion for PCT/EP2015/073936 dated Feb. 4, 2016, all pages.

U.S. Appl. No. 14/485,188, filed Sep. 12, 2014, Final Rejection dated Feb. 23, 2016, 22 pages.

U.S. Appl. No. 14/567,348, filed Dec. 11, 2014, Preinterview first office action dated Jan. 20, 2016, 23 pages.

U.S. Appl. No. 15/289,395, filed Oct. 10, 2016 Non-Final Rejection dated Jun. 19, 2017, all pages.

(56) References Cited

OTHER PUBLICATIONS

U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015 Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
International Preliminary Report on Patentability for PCT/US2014/055476 dated Jun. 14, 2016, 9 pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
International Preliminary Report on Patentability for PCT/US2016/028126 dated Nov. 14, 2017, all pages.
International Search Report and Written Opinion for PCT/US2017/047900 dated Nov. 24, 2017.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.

(56) References Cited

OTHER PUBLICATIONS

U.S. Appl. No. 14/986,483, filed Dec. 31, 2015, Non-Final Rejection dated Dec. 1, 2017, all pages.
U.S. Appl. No. 14/584,075, filed Dec. 29, 2014, Notice of Allowance dated Dec. 26, 2017, all pages.
U.S. Appl. No. 14/710,331, filed May 12, 2015, Notice of Allowance dated Dec. 7, 2017, all pages.
U.S. Appl. No. 14/832,821, filed Aug. 21, 2015, Notice of Allowance dated Dec. 18, 2017, all pages.
Mark Edward Soper, "Absolute Beginner's Guide to Home Automation," 2005, Que Publishing, p. 57, 121.
U.S. Appl. No. 14/982,366, filed Dec. 29, 2015, Non-Final Rejection dated Nov. 1, 2017, all pages.
U.S. Appl. No. 15/246,079, filed Aug. 24, 2016, Non-Final Rejection dated Oct. 19, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/981,501, filed Dec. 28, 2015, Final Office Action dated Oct. 10, 2017, all pages.
U.S. Appl. No. 14/528,402, filed Oct. 30, 2014, Final Rejection dated Oct. 31, 2017, all pages.
Notification of Publication of European Application No. 15763643.2 as EP 3189511 dated Jul. 12, 2017, 1 page.
Notification of Publication of Brazilian Application No. BR 11 2016 0112032 dated Aug. 8, 2017, 2 pages.
Notification of Publication of Brazilian Application No. BR 11 2016 010376 9 dated Aug. 8, 2017, 1 page.
Supplementary European Search Report for EP 14868928 dated Jul. 7, 2017, 11 pages.
Supplementary European Search Report for EP 14870507 dated Jun. 28, 2017, all pages. (Received in KTS FIP in Sep. 2017, all refs from SR already cited).
U.S. Appl. No. 14/584,075, filed Dec. 29, 2014, Final Rejection dated Sep. 9, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014 Preinterview first office action dated Oct. 6, 2017, all pages.

\* cited by examiner

SYSTEM AND METHOD FOR HVAC HEALTH MONITORING USING A TELEVISION RECEIVER

BACKGROUND

Home automation systems may offer a notification if there is an issue with the home's heating, ventilation, and air conditioning ("HVAC") system. Existing systems may provide an alert that there is an issue, however existing systems fail to further identify the problem, issue, or error or provide information allowing the homeowner to resolve the problem, issue, or error. The homeowner is often left with no option other than to hire an HVAC professional to fix the issue, sometimes needlessly costing the homeowner time and money.

SUMMARY

In some embodiments, a method may be provided including receiving, at an electronic device, a temperature value from a temperature sensor located at a vent grate of an HVAC system, the temperature value indicating the temperature of the air emitting from the HVAC system. The method may include receiving, at the electronic device, an airflow value from a pressure sensor located at the vent grate of the HVAC system, the airflow value determined by the pressure differential of the air emitting from the HVAC system. The method may include calculating, at the electronic device, a temperature delta value based on the temperature value and an ambient temperature value. The method may include comparing, at the electronic device, the temperature delta value with a predetermined temperature delta threshold value, wherein the predetermined temperature delta threshold value is stored in a storage device communicatively coupled to the electronic device. The method may include comparing, at the electronic device, the airflow value with a predetermined airflow threshold value, wherein the predetermined airflow threshold value is stored in the storage device. The method may include identifying, by the electronic device, based at least in part on at least one of the comparing the temperature delta value step and the comparing the airflow value step, an error with the HVAC system. The method may include sending a notification of the error from the electronic device to a user.

Embodiments of such a method may include one or more of the following features: The method may include receiving, at the electronic device, a known good airflow value from the pressure sensor located at the vent grate of the HVAC system, the known good airflow value determined by the pressure differential of the air emitting from the HVAC system during a known good operating cycle. The method may include receiving, at the electronic device, a known good temperature value from the temperature sensor located at the vent grate of the HVAC system, the known good temperature value indicating the temperature of the air emitting from the HVAC system during a known good operating cycle. The method may include calculating, by the electronic device, the predetermined airflow threshold value based on the known good airflow value. The method may include calculating, by the electronic device, the predetermined temperature delta threshold value based on the known good temperature value. The method may include storing the predetermined airflow threshold value and the predetermined temperature delta threshold value in the storage device.

The method may further include receiving, at the electronic device, a carbon monoxide value from a carbon monoxide sensor located at the vent grate of the HVAC system, the carbon monoxide value indicating the level of carbon monoxide emitting from the HVAC system. The method may include identifying, by the electronic device, the error as a leak in a heat exchanger based on determining, by the electronic device, the temperature delta value is below the upper temperature delta threshold value and above the lower temperature delta threshold value, indicating the temperature delta value is an acceptable value; determining, by the electronic device, the airflow value is below the upper airflow threshold value and above the lower airflow threshold value, indicating the airflow value is an acceptable value; comparing, by the electronic device, the carbon monoxide value with a predetermined carbon monoxide threshold; and determining, by the electronic device, that the carbon monoxide value is above the predetermined carbon monoxide threshold, indicating the carbon monoxide value is a dangerous level. The method may include alerting the user to vacate the premises. The method may include sending a signal from the electronic device to an electronic window opening device instructing the electronic window opening device to open the window. The method may include receiving, at the electronic device, the ambient temperature value from a second temperature sensor located at the vent grate of the HVAC system.

The method may include identifying, by the electronic device, the error as an HVAC system failure based on receiving, at the electronic device, a signal from the HVAC system indicating that the HVAC system is actively running and determining, by the electronic device, based on comparing the airflow value with the predetermined airflow threshold value, that the HVAC system is not actively running or running poorly.

The method may include identifying, by the electronic device, the error as degrading of a filter based on determining, by the electronic device, that the airflow value is below the predetermined airflow threshold value and determining, by the electronic device, that the temperature delta value is above the predetermined temperature delta threshold, wherein the notification may alert the user to change the filter.

The method may include identifying, by the electronic device, the error as a pilot light failure based on determining, by the electronic device, that the airflow value is an acceptable value and determining, by the electronic device, that the temperature delta value is below the predetermined temperature delta threshold value, wherein the notification may alert the user to light the pilot light.

In some embodiments, a system may be provided including a temperature sensor, the temperature sensor being located in a vent grate of a Heating, Ventilation, and Air Conditioning (HVAC) system and configured to measure a temperature of air emitting from the HVAC system. The system may include a pressure sensor, the pressure sensor being located in the vent grate of the HVAC system and configured to measure an airflow of air emitting from the HVAC system. The system may include a storage device. The system may include an electronic device communicatively coupled to the temperature sensor, the pressure sensor, and the storage device, and the electronic device may include one or more processors and memory communicatively coupled with and readable by the one or more processors and having stored therein processor-readable instructions which, when executed by the one or more processors, cause the one or more processors to receive a temperature value from the temperature sensor; receive an airflow value from the pressure sensor; calculate a temperature delta value based on the temperature value and an ambient temperature value; compare the temperature delta value with a predetermined temperature delta threshold value, wherein the predetermined temperature delta threshold value is stored in the storage device; compare the airflow value with a predetermined airflow threshold value, wherein the predetermined airflow threshold value is stored in the storage device; identify, based on at least one of comparing the temperature delta value with the predetermined temperature delta threshold value and comparing the airflow value with the predetermined airflow threshold value, an error with the HVAC system; and send a notification of the error to a user.

Embodiments of such a system may include one or more of the following features: The memory further may have stored therein processor-readable instructions which, when executed by the one or more processors, cause the one or more processors to receive a known good airflow value from the pressure sensor located at the vent grate of the HVAC system, the known good airflow value determined by the pressure of the air emitting from the HVAC system during a known good operating cycle; receive a known good temperature value from the temperature sensor located at the vent grate of the HVAC system, the known good temperature value indicating the temperature of the air emitting from the HVAC system during a known good operating cycle; calculate the predetermined airflow threshold value based on the known good airflow value; calculate the predetermined temperature delta threshold value based on the known good temperature value; and store the predetermined airflow threshold value and the predetermined temperature delta threshold value in the storage device.

The memory further may have stored therein processor-readable instructions which, when executed by the one or more processors, cause the one or more processors to receive a carbon monoxide value from a carbon monoxide sensor located at the vent grate of the HVAC system, the carbon monoxide value indicating the level of carbon monoxide emitting from the HVAC system; and identify the error as a leak in a heat exchanger based on determining the temperature delta value is an acceptable value based on comparing the temperature delta value with the predetermined temperature delta threshold value, determining the airflow value is an acceptable value based on comparing the airflow value with the predetermined airflow threshold value, comparing the carbon monoxide value with a predetermined carbon monoxide threshold, and determining that the carbon monoxide value is above the predetermined carbon monoxide threshold, indicating the carbon monoxide value is a dangerous level. The memory further may have stored therein processor-readable instructions which, when executed by the one or more processors, cause the one or more processors to send a signal to an electronic window opening device instructing the electronic window opening device to open the window.

The memory further may have stored therein processor-readable instructions which, when executed by the one or more processors, cause the one or more processors to identify the error as an HVAC system failure based on receiving a signal from the HVAC system indicating that the HVAC system is actively running and determining, based on comparing the airflow value with the predetermined airflow threshold value, that the HVAC system is not actively running or running poorly.

The memory further may have stored therein processor-readable instructions which, when executed by the one or more processors, cause the one or more processors to identify the error as degrading of a filter based on determining that the airflow value is below the predetermined airflow threshold value and determining that the temperature delta value is above the predetermined temperature delta threshold.

The memory further may have stored therein processor-readable instructions which, when executed by the one or more processors, cause the one or more processors to identify the error as a pilot light failure based on determining that the airflow value is an acceptable value and determining that the temperature delta value is below the predetermined temperature delta threshold value, wherein the predetermined temperature delta threshold value indicates a pilot light failure.

The memory further may have stored therein processor-readable instructions which, when executed by the one or more processors, cause the one or more processors to receive the ambient temperature value from a second temperature sensor located at the vent grate of the HVAC system.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ability to diagnose an issue (e.g., an error) with a home heating, ventilation, and air conditioning ("HVAC") system can be useful to a homeowner, in some cases saving the homeowner hundreds of dollars in unnecessary work by professional HVAC repairmen. While issues with a home's HVAC system are sometimes obvious (e.g., the furnace is not heating the home), the reason for the issue is not always apparent. Receiving notifications from a home automation system with information detailing the reason for any issues with the HVAC system can be useful to the homeowner.

Embodiments detailed herein present an HVAC health monitoring device that can be installed in a vent grate of an HVAC system. The device can surveil the output of the HVAC system. The device can include sensors that can track, for example, the temperature and pressure output of the HVAC system.

In some embodiments, the device can be installed as part of a home automation system. The device can communicate with an electronic device, for example, a home automation control unit. The home automation control unit can receive data (e.g., the sensor output) from the device and utilize the data to determine whether the HVAC system is experiencing issues. The home automation control unit can then notify the homeowner of the issue, including details about the issue and possible resolutions. After describing media service systems and electronic devices in FIGS. 1 and 2 that may be utilized in the present technology, methods and systems will be explained with the remaining figures.

Figure 1:
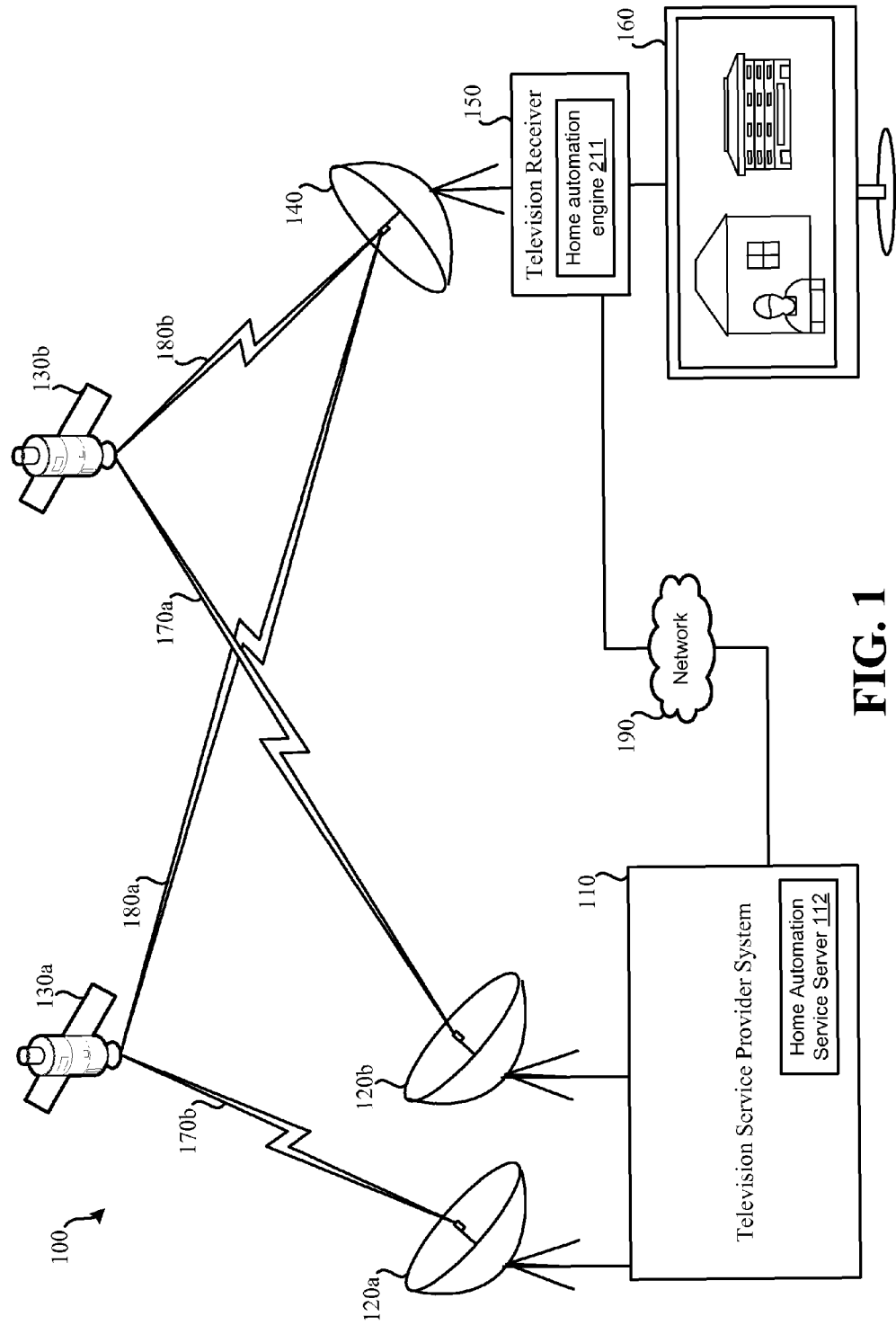
FIG. 1 illustrates an embodiment of a television service provider system that provides home automation functionality.

FIG. 1 illustrates an embodiment of a satellite television distribution system 100. While a home automation system may be incorporated with various types of television receivers, various embodiments may be part of a satellite-based television distribution system. Cable, IP-based, wireless, and broadcast focused systems are also possible. Satellite television distribution system 100 may include: television service provider system 110, satellite transmitter equipment 120, satellites 130, satellite dish 140, television receiver 150, home automation service server 112, and display device 160. The display device 160 can be controlled by, for example, a user using a remote control device that can send wired or wireless signals to communicate with the STB 150 and/or display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to a television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
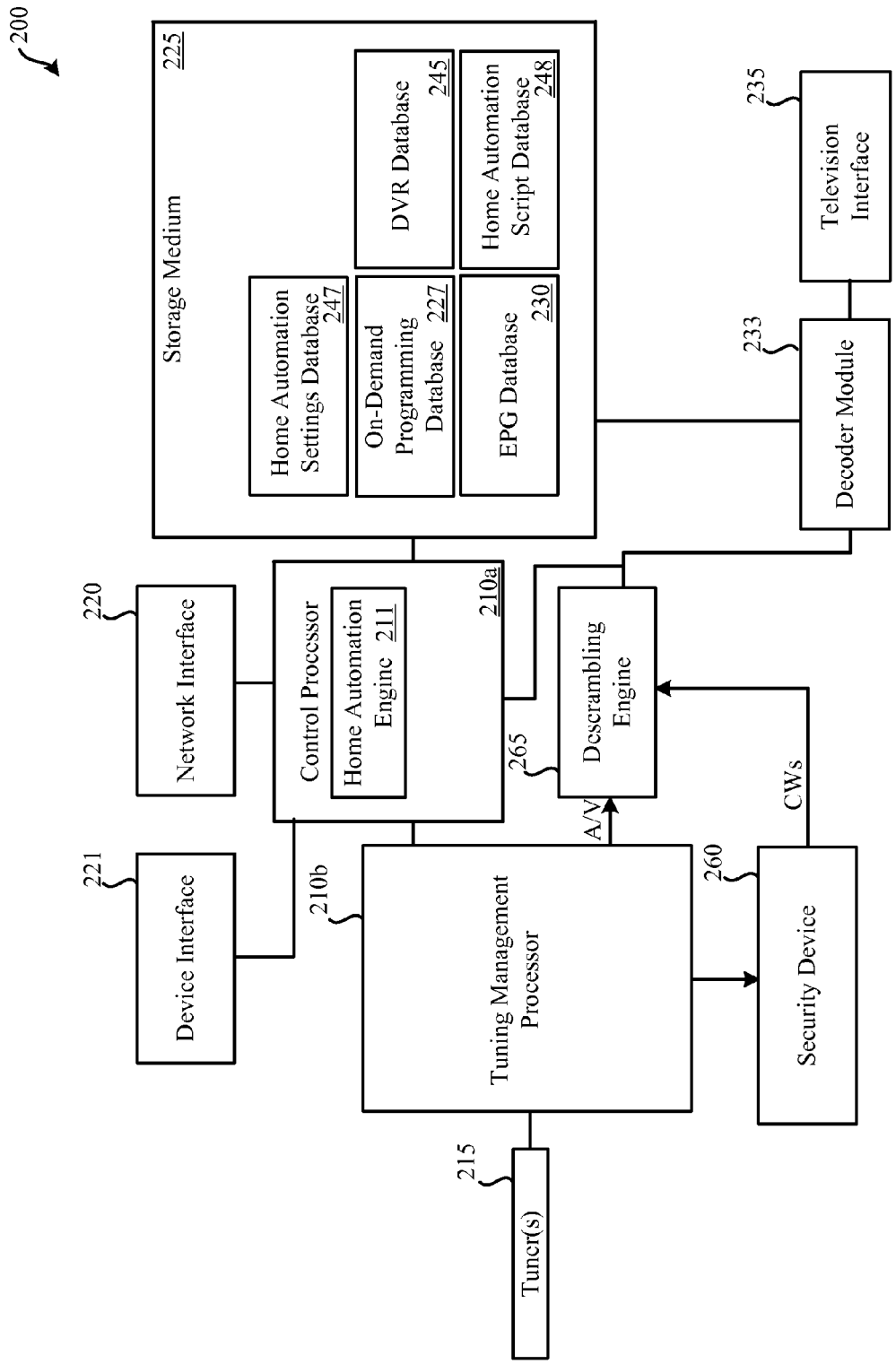
FIG. 2 illustrates an embodiment of a television receiver that functions as a host for a home automation system.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 provides additional detail of various embodiments of a television receiver. A television receiver is defined to include set-top boxes (STBs), and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 211, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170a represents a signal between satellite transmitter equipment 120 and satellite 130a. Uplink signal 170b represents a signal between satellite transmitter equipment 120 and satellite 130b. Each of uplink signals 170 may contain streams of one or more different television channels. For example, uplink signal 170a may contain a first group of television channels, while uplink signal 170b contains a second group of television channels. Each of these television channels may be scrambled such that unauthorized persons are prevented from accessing the television channels.

Downlink signal 180a represents a signal between satellite 130a and satellite dish 140.

Downlink signal 180b represents a signal between satellite 130b and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180a may be a first transponder stream containing a first group of television channels, while downlink signal 180b may be a second transponder stream containing a different group of television channels. In addition to or instead of containing television channels, a transponder stream can be used to transmit on-demand content to television receivers, including PPV content, which may be stored locally by the television receiver until output for presentation.

FIG. 1 illustrates downlink signal 180a and downlink signal 180b, being received by satellite dish 140 and distributed to television receiver 150. For a first group of television channels, satellite dish 140 may receive downlink signal 180a and for a second group of channels, downlink signal 180b may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112.

Although illustrated as part of the television service provider system, the home automation service server 112 may be provided by a third party in embodiments. In addition or in alternate to network 190, a telephone, e.g., landline, or cellular connection may be used to enable communication between television receiver 150 and television service provider system 110.

FIG. 2 illustrates an embodiment of a television receiver 200, which may represent television receiver 150 of FIG. 1. Television receiver 200 may be configured to function as a host for a home automation system either alone or in conjunction with a communication device. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 200 may be incorporated as part of a television, such as display device 160 of FIG. 1. Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 227, home automation settings database 247, home automation script database 248, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210a may also communicate with network interface 220 and remote control interface 250. Control processor 210a may handle incoming data from network interface 220 and remote control interface 250. Additionally, control processor 210a may be configured to output data via network interface 220.

Control processor 210a may include home automation engine 211. Home automation engine 211 may permit television receiver and control processor 210a to provide home automation functionality. Home automation engine 211 may have a JSON (JavaScript Object Notation) command interpreter or some other form of command interpreter that is configured to communicate with wireless devices via network interface 220 and a message server, possibly via a message server client. Such a command interpreter of home automation engine 211 may also communicate via a local area network with devices without using the Internet. Home automation engine 211 may contain multiple controllers specific to different protocols; for instance, a ZigBee® controller, a Z-Wave® controller, and/or an IP camera controller, wireless LAN, 802.11, may be present. Home automation engine 211 may contain a media server configured to serve streaming audio and/or video to remote devices on a local area network or the Internet. Television receiver may be able to serve such devices with recorded content, live content, and/or content recorded using one or more home automation devices, such as cameras.

Tuners 215 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 215 may be capable of receiving and processing a single transponder stream from a satellite transponder or from a cable network at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to which frequencies are to be tuned.

Network interface 220 may be used to communicate via an alternate communication channel with a television service provider, if such communication channel is available. A communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used. Network interface 220 may permit wireless communication with one or more types of networks, including using home automation network protocols and wireless network protocols. Also, wired networks may be connected to and communicated with via network interface 220. Device interface 221 may represent a USB port or some other form of communication port that permits communication with a communication device as will be explained further below.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, home automation settings database 247, and/or home automation script database 248. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

Home automation settings database 247 may allow configuration settings of home automation devices and user preferences to be stored. Home automation settings database 247 may store data related to various devices that have been set up to communicate with television receiver 200. For instance, home automation settings database 247 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Home automation settings database 247 may store information that allows for the configuration and control of individual home automation devices which may operate using Z-wave® and ZigBee®-specific protocols. To do so, home automation engine 211 may create a proxy for each device that allows for settings for the device to be passed through a UI, e.g., presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device. For example, a piece of exercise equipment that is enabled to interface with the home automation engine 211, such as via device interface 221, may be configured at the electronic device 211 in addition to on the piece of exercise equipment itself Additionally, a mobile device or application residing on a mobile device and utilized with exercise equipment may be configured in such a fashion as well for displaying received fitness information on a coupled display device.

Home automation script database 248 may store scripts that detail how home automation devices are to function based on various events occurring. For instance, if stored content starts being played back by television receiver 200, lights in the vicinity of display device 160 may be dimmed and shades may be lowered by communicatively coupled and controlled shade controller. As another example, when a user shuts programming off late in the evening, there may be an assumption the user is going to bed. Therefore, the user may configure television receiver 200 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, home automation script database 248 may allow for various music profiles to be implemented. For instance, based on home automation settings within a structure, appropriate music may be played. For instance, when a piece of exercise equipment is connected or is used, energizing music may be played. Conversely, based on the music being played, settings of home automation devices may be determined. If television programming, such as a movie, is output for playback by television receiver 150, a particular home automation script may be used to adjust home automation settings, e.g., lower lights, raise temperature, and lock doors.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 230 and/or information from EPG database 230, to a television for presentation. Television interface 235 may also serve to output a CVM.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

On-demand programming database 227 may store additional television programming.

On-demand programming database 227 may include television programming that was not recorded to storage medium 225 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet.

Referring back to tuners 215, television channels received via satellite or cable may contain at least some scrambled data. Packets of audio and video may be scrambled to prevent unauthorized users, e.g., nonsubscribers, from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card, or the like.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage, in DVR database 245, and/or to decoder module 233 for output to a television or other presentation equipment via television interface 235.

In some embodiments, the television receiver 200 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 200 may be configured to reboot at random times during the night in order to allow for installation of updates. Thus, an intruder is less likely to guess the time when the system is rebooting. In some embodiments, the television receiver 200 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 900 of FIG. 9.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 200 may be performed by an overlay device. If such an overlay device is used, television programming functions may still be provided by a television receiver that is not used to provide home automation functions.

Figure 3:
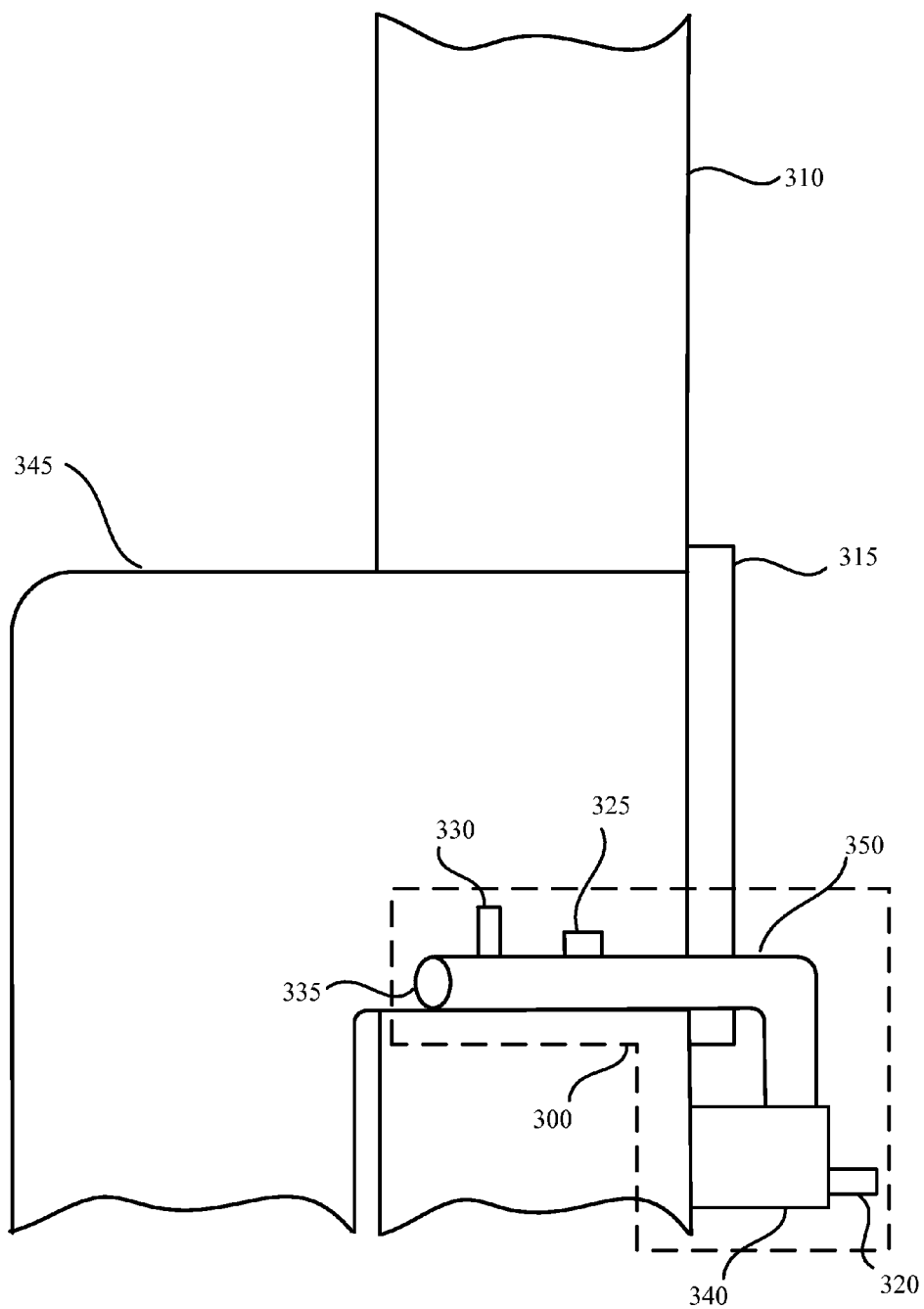
FIG. 3 illustrates an embodiment of an HVAC health monitoring system.

FIG. 3 illustrates an embodiment of an HVAC health monitoring system 300. The HVAC health monitoring system 300 can include an HVAC health monitoring device 340, a pressure sensor 335, a temperature sensor 330, a carbon monoxide sensor 325, tubing 350, and an ambient temperature sensor 320. Additionally depicted in FIG. 3 are a wall 310, a vent grate 315, and an HVAC duct 345. The HVAC health monitoring system 300 can be used to alert the homeowner or a resident of the premises associated with the HVAC system of an error with the HVAC system by, for example, providing a warning or notification about the functioning of the system, as described further below.

The HVAC health monitoring system 300 can be installed in the vent grate 315 of a wall 310. The vent grate 315 can cover the opening of an HVAC duct 345 in wall 310. In some embodiments, the vent grate 315 can cover the opening of an HVAC duct 345 in a floor (not shown) or a ceiling (not shown). Installation of HVAC health monitoring system 300 can be performed by a professional, by a homeowner, or by any other suitable individual or company.

Vent grate 315 can be made of metal, wood, plastic, or any other suitable material to cover the opening of HVAC duct 345. Vent grate 315 can have slotted openings or any other suitable openings such that heated or cooled air from HVAC duct 345 can be distributed throughout the home or premises.

Figure 5:
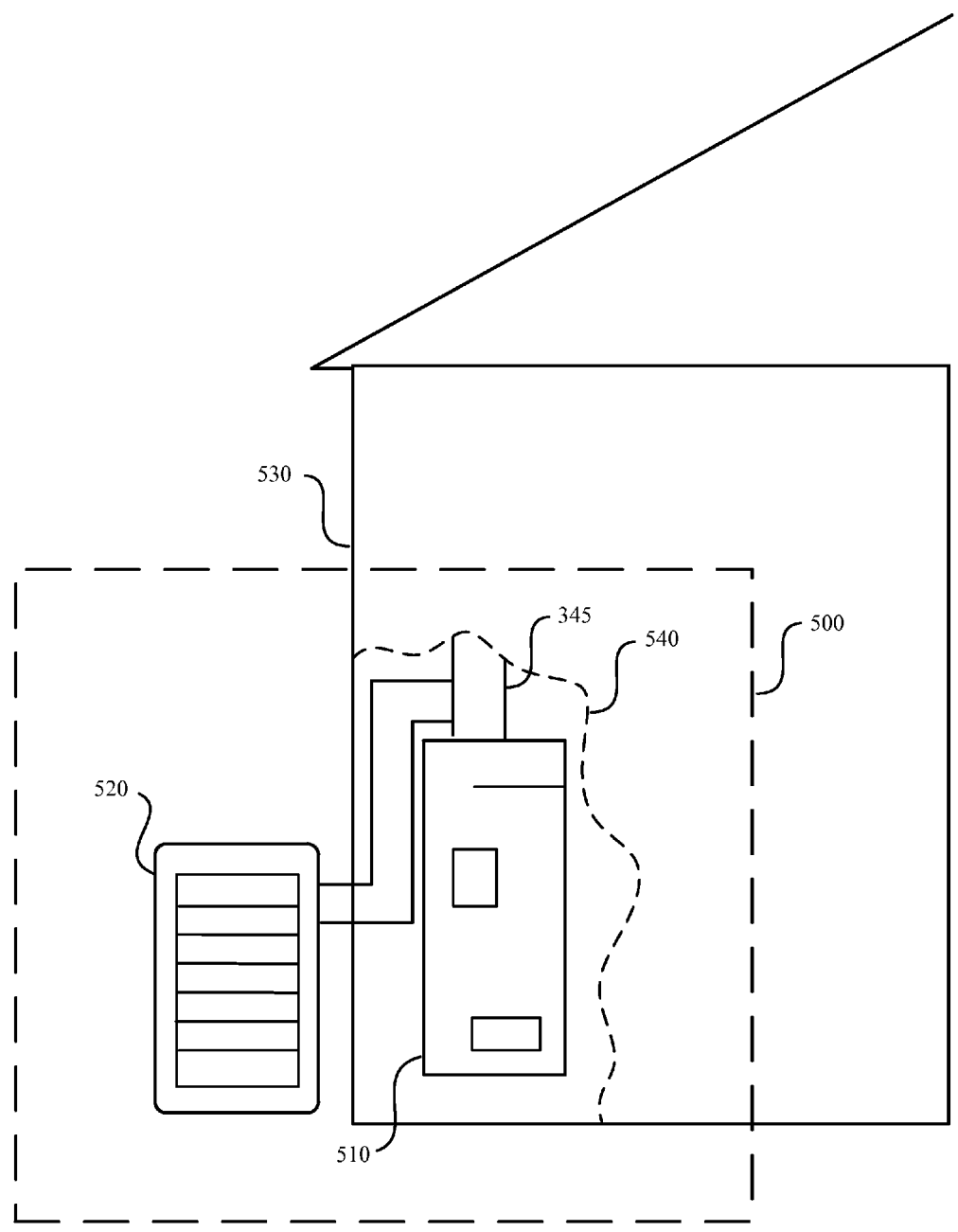
FIG. 5 illustrates an example HVAC system as might be utilized in an embodiment of an HVAC health monitoring system.

HVAC duct 345 can be coupled to an HVAC system, for example, HVAC system 500 of FIG. 5. The HVAC duct 345 can function to allow heated or cooled air from HVAC system 500 to be distributed to the various rooms of a home or premises.

HVAC health monitoring system 300 can include an HVAC health monitoring device 340, pressure sensor 335, temperature sensor 330, carbon monoxide sensor 325, tubing 350, and ambient temperature sensor 320.

Pressure sensor 335 can be an absolute pressure sensor or a differential pressure sensor. Pressure sensor 335 can measure the pressure or pressure differential in HVAC duct 345. The pressure differential in HVAC duct 345 can represent the airflow of the system (i.e., the pressure of the air emitting from an HVAC system when the system is actively running) For example, the airflow of HVAC system 500; FIG. 5 can be measured by pressure sensor 335. In some embodiments, the pressure can be measured by an absolute pressure sensor when the system is actively running and when the system is not actively running The value of the pressure when the system is not actively running can be subtracted from the value of the pressure when the system is actively running to obtain the airflow (i.e., the pressure differential) in HVAC system 500. In some embodiments, pressure sensor 335 can be a differential pressure sensor and the value can represent the airflow (i.e., the pressure differential) in HVAC system 500. In such an embodiment, tubing 350 can be used like a pitot tube to funnel the air travelling through HVAC duct 350 for measurement by pressure sensor 335. Pressure sensor 335 can be located in or near HVAC health monitoring device 340. The pressure in HVAC duct 345 can be high or increased if the HVAC system is actively running (i.e., a furnace is heating air or an air conditioner is cooling air). In a typical HVAC system, distribution of the heated or cooled air includes circulating the air through the premises by pushing it via a fan through the HVAC ducts. In some embodiments, pressure sensor 335 can be included in HVAC health monitoring system 300 by being coupled to the HVAC health monitoring device 340 directly via electrical wiring. In some embodiments, pressure sensor 335 can be wirelessly coupled to the HVAC health monitoring device 340 using, for example, Bluetooth®, ZigBee®, any of the IEEE 802.11 family of wireless protocols, or any other wireless protocol.

Temperature sensor 330 can be a temperature sensor for measuring the temperature in HVAC duct 345. The temperature in HVAC duct 345 can represent the temperature of the air emitting from the HVAC system (e.g., HVAC system 500; FIG. 5). The temperature in HVAC duct 345 can be high or increased a furnace (e.g., furnace 510; FIG. 5) of the HVAC system is actively running The temperature in HVAC duct 345 can be low or decreased if an air conditioner (e.g., air conditioner 520; FIG. 5) of the HVAC system is actively running In some embodiments, temperature sensor 330 can be coupled to HVAC health monitoring device 340 either through direct wiring or wirelessly similarly to pressure sensor 335 as described above.

Carbon monoxide sensor 325 can be a sensor for measuring the level of carbon monoxide in HVAC duct 345. The carbon monoxide level in HVAC duct 345 can represent the amount of carbon monoxide emitting from the HVAC system (e.g. HVAC system 500; FIG. 5). In some embodiments, carbon monoxide sensor 325 can be wired or wirelessly coupled to HVAC health monitoring device 340, similarly to pressure sensor 335 as described above.

Tubing 350 can be used to direct the local air in HVAC duct 345 for measurement by pressure sensor 335. Tubing 350 can be, for example, a pitot tube. Tubing 350 can be positioned directly in the path of the air flowing through HVAC duct 345 to allow a very accurate reading of the airflow in HVAC duct 345 and allow pressure sensor 335 to be positioned in or near HVAC health monitoring device 340. Pressure sensor 335 can be positioned near the end of tubing 350 nearest HVAC health monitoring device 340 to accurately read the airflow in HVAC duct 345. Tubing 350 can include an attachment mechanism (not shown) to attach the tubing 350 to the HVAC duct 345 through the vent grate 315. For example, tubing 350 can include an adhesive that can attach to HVAC duct 345. As another example, tubing 350 can include a clipping mechanism that can attach to vent grate 315. Tubing 350 can be rigid or flexible. In some embodiments, tubing 350 can be flexible such that it can be adjusted to most suitably attach to the HVAC duct 345 or vent grate 315. In some embodiments, tubing 350 can be flexible such that it can be inserted into vent grate 315 through existing slots in vent grate 315. In other embodiments, tubing 350 can be installed by cutting an opening in vent grate 315 for insertion of tubing 350 and the other components of HVAC health monitoring system 300 that can be inserted into HVAC duct 345.

In some embodiments, pressure sensor 335, tubing 350, carbon monoxide sensor 325, and temperature sensor 330 can be distributed within vent grate 315 and individually attach to HVAC duct 345. In some embodiments, one or more of pressure sensor 335, tubing 350, carbon monoxide sensor 325, and temperature sensor 330 can be coupled together and collectively attached within vent grate 315 to HVAC duct 345.

Ambient temperature sensor 320 can be a temperature sensor for measuring the ambient temperature of the room or premises. The ambient temperature of the room or premises can indicate the "room temperature." While the temperature may be heated or cooled based on the HVAC system (e.g. HVAC system 500; FIG. 5), the heated or cooled air is dissipated in the volume of the room, making, in some cases, the ambient temperature of the room different than the temperature of the air emitting from the HVAC system when the HVAC system is actively running In some embodiments, ambient temperature sensor 320 can be wired or wirelessly coupled to HVAC health monitoring device 340, similarly to pressure sensor 335 as described above.

HVAC Health Monitoring Device 340 can be wired or wirelessly coupled to components including, for example, pressure sensor 335, temperature sensor 330, carbon monoxide sensor 325, and ambient temperature sensor 320. HVAC Health Monitoring Device 340 can also include a communication component (not shown) that can wirelessly communicate with an electronic device, such as, for example television receiver 200 (FIG. 2). HVAC Health Monitoring Device 340 can communicate with the electronic device, sending, for example, airflow values from pressure sensor 335, temperature values from temperature sensor 330, carbon monoxide values from carbon monoxide sensor 325, and ambient temperature values from ambient temperature sensor 320. HVAC Health Monitoring Device 340 can communicate with the electronic device through a wired connection or wirelessly. If communicating wirelessly, any suitable wireless communication protocol can be used, including, for example, Bluetooth®, ZigBee®, any of the IEEE 802.11 family of wireless protocols, or any other wireless protocol.

In use, HVAC Health Monitoring System 300 can be used to communicate information regarding the HVAC system (e.g., HVAC system 500; FIG. 5) to an electronic device (e.g., television receiver 200; FIG. 2) for inspection. In some embodiments, the furnace (e.g. furnace 510) of the HVAC system is operating (i.e., the furnace is on and actively heating air). As the furnace heats the air, a fan is typically used to distribute the air to the premises through HVAC duct 345. As the heated air flows past pressure sensor 335, the pressure can be measured in HVAC duct 345 and the pressure value can be communicated to HVAC Health Monitoring Device 340. As the heated air flows past temperature sensor 330, the temperature can be measured in HVAC duct 345 and the temperature value can be communicated to HVAC Health Monitoring Device 340. Similarly, the carbon monoxide sensor 325 can measure the carbon monoxide level in HVAC duct 345 and communicate the carbon monoxide level to the HVAC Health Monitoring Device 340. Ambient temperature sensor 320 can measure the ambient temperature of the room or premises and communicate the ambient temperature to HVAC Health Monitoring Device. The ambient temperature measurement can be taken at any time, whether the HVAC system is actively operating or not. After receiving one or more of the values from the various sensors, HVAC Health Monitoring Device 340 can provide the values to the electronic device through wired or wireless communication as described above. Processing of the data by the electronic device will be discussed in more detail below.

Figure 4:
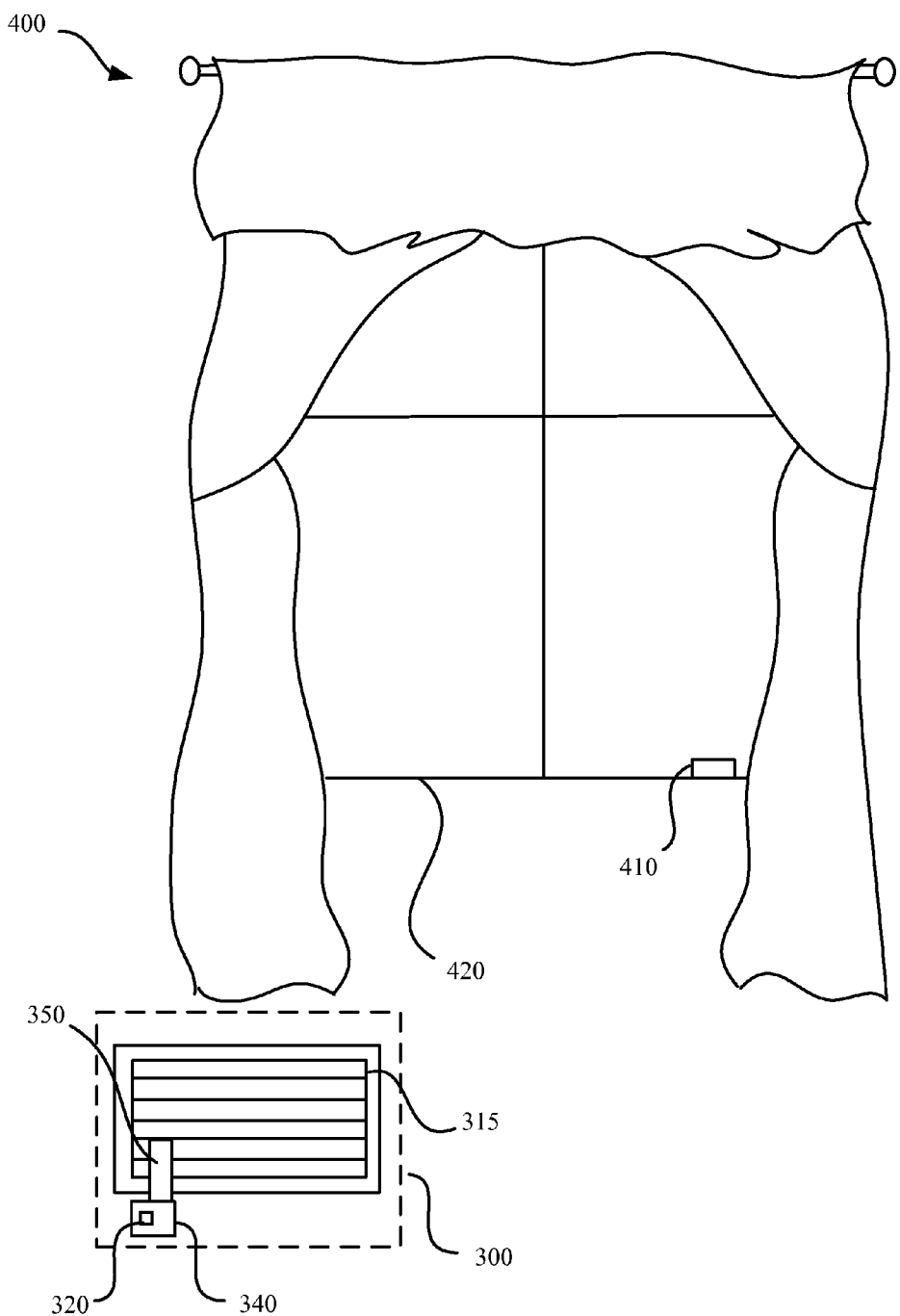
FIG. 4 illustrates another embodiment of an HVAC health monitoring system.

FIG. 4 illustrates a room 400 with a window 420 having an electronic window opening device 410, the room also having HVAC health monitoring system 300 as described in FIG. 3.

HVAC health monitoring system 300 can be in room 400. As described in more detail above, HVAC health monitoring system 300 can include vent grate 315 and HVAC health monitoring device 340 including ambient temperature sensor 320 and tubing 350. HVAC health monitoring system 300 can also include the other components such as pressure sensor 335, temperature sensor 330, and carbon monoxide sensor 325, though they are not shown in FIG. 4.

Room 400 can include window 420, which can be any window capable of opening. Electronic window opening device 410 can be associated with window 420 such that it is capable of opening window 420. For example, electronic window opening device 410 can be attached to a mechanical device (not shown) that can open window 420. The mechanical device can be a hydraulic device, a gear system, a pulley system, or any other device capable of opening window 420.

In use, electronic window opening device 410 can receive a signal from an electronic device, such as, for example, television receiver 200 (FIG. 2). The signal can notify the electronic window opening device 410 to open window 420. This signal can be in response to the electronic device identifying an error in the HVAC system, as described in more detail below.

FIG. 5 illustrates an embodiment of an HVAC system 500. FIG. 5 includes house 530, which includes HVAC system 500. HVAC system 500 includes air conditioner 520, furnace 510, and HVAC duct 345. Cutout line 540 is intended to indicate that the wall of house 530 is cutaway to expose furnace 510 and HVAC duct 345.

House 530 can include one or more rooms. House 530 can be any premises or dwelling that includes HVAC system 500.

Air conditioner 520 can be any air conditioner used in an HVAC system. Air conditioner 520 can cool air, which is distributed through the HVAC duct 345 to the rooms of house 530. In some embodiments, HVAC system 500 does not include air conditioner 520.

Furnace 510 can be any furnace used in an HVAC system. Furnace 510 can heat air, which is distributed through the HVAC duct 345 to the rooms of house 530. In some embodiments, HVAC system 500 does not include furnace 510.

In a typical HVAC system, either the furnace 510 can be actively running or the air conditioner 520 can be actively running, but not both. In other words, the furnace 510 can be heating air or the air conditioner 520 can be cooling air, but not at the same time. Actively running means, with respect to furnace 510 or air conditioner 520 or HVAC system 500, for the purposes of this disclosure, actively heating or cooling air. For example, if the furnace 510 is on, but not currently heating air, it is not actively running Similarly, if the air conditioner 520 is on, but not currently cooling air, it is not actively running Furnace 510 may cycle to keep house 530 at a relatively constant temperature as set by a thermostat (not shown). A cycle may include the furnace 510 actively running to heat air until the thermostat reaches a threshold upper temperature reading at which time the furnace 510 stops actively running While the furnace 510 is still on, it is not actively running until the thermostat reaches a threshold lower temperature at which time the furnace 510 starts actively running again.

Similarly, air conditioner 520 may cycle to keep house 530 at a relatively constant temperature as set by a thermostat (not shown). A cycle may include the air conditioner 520 actively running to cool air until the thermostat reaches a threshold lower temperature reading at which time the air conditioner 520 stops actively running While the air conditioner 520 is still on, it is not actively running until the thermostat reaches a threshold upper temperature at which time the air conditioner 520 starts actively running again.

HVAC duct 345 shows only a small portion of the ductwork that can be in house 530. All HVAC ductwork throughout house 530 can be included in HVAC system 500.

Figure 6:
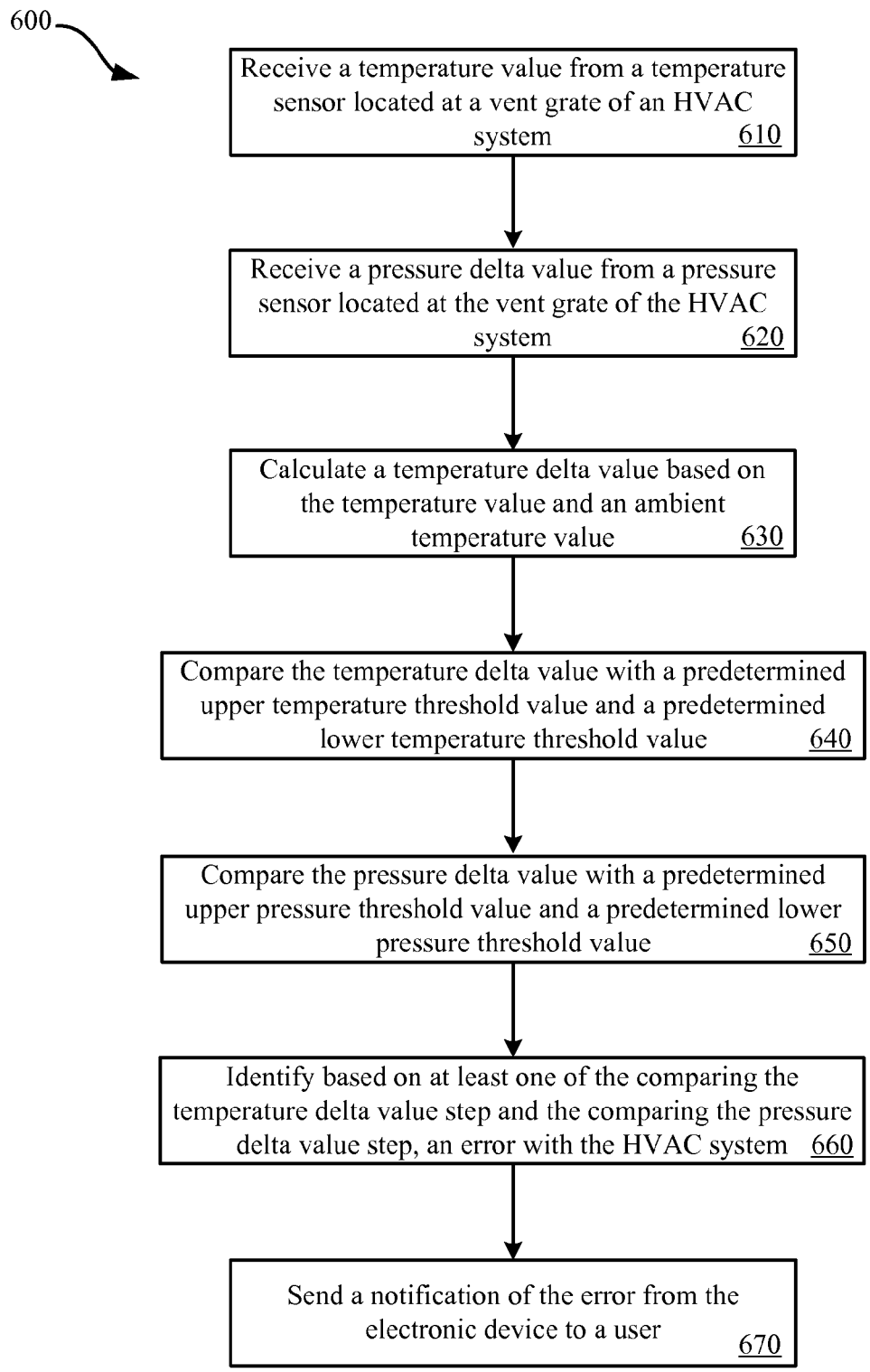
FIG. 6 illustrates an embodiment of a method for using an HVAC health monitoring system.

FIG. 6 illustrates an embodiment of a method 600 for using an HVAC health monitoring system, such as HVAC health monitoring system 300 (FIG. 3). The method will be described in relation to the system components described above with respect to FIGS. 3-5. While the embodiments and system components described with respect to FIGS. 3-5 are an embodiment of the present invention, other embodiments and components can be used to complete the method illustrated in FIG. 6.

An electronic device, such as the television receiver 200 shown in FIG. 2, can be used to complete method 600. For example, the television receiver 200 can receive a temperature value from temperature sensor 330 which is located at vent grate 315 of HVAC system 500. More specifically, for example, the temperature sensor 330 can obtain the temperature value while HVAC system 500 is actively running The temperature value can be communicated to the HVAC health monitoring device 340 through a wired or wireless connection that can couple the temperature sensor 330 and HVAC health monitoring device 340. HVAC health monitoring device 340 can wirelessly transmit the temperature value to the network interface 220 of the television receiver 200 via, for example, ZigBee®.

The television receiver 200 can also receive an airflow value from pressure sensor 335 located at vent grate 315 of the HVAC system 500. More specifically, for example, the pressure sensor 335 can obtain the airflow value while HVAC system 500 is actively running The airflow value can be communicated to the HVAC health monitoring device 340 through a wired or wireless connection that couples the pressure sensor 335 and HVAC health monitoring device 340. HVAC health monitoring device 340 can wirelessly transmit the airflow value to the network interface 220 of the television receiver 200 via, for example, ZigBee®.

The television receiver 200 can calculate a temperature delta value based on the temperature value and an ambient temperature value. The television receiver 200 can obtain the ambient temperature value in a number of ways. For example, in some embodiments, the ambient temperature sensor 320 can obtain the ambient temperature value and communicate it to HVAC health monitoring device 340 through a wired connection that can couple the ambient temperature sensor 320 and HVAC health monitoring device 340. HVAC health monitoring device 340 can wirelessly transmit the ambient temperature value to the network interface 220 of the television receiver 200 via, for example, ZigBee®. In some embodiments, the ambient temperature value can be obtained from an ambient temperature sensor that is not coupled to HVAC health monitoring device 340. In such embodiments, the ambient temperature value can be communicated through a wired connection or a wireless connection to television receiver 200. Once the television receiver 200 has obtained the ambient temperature value, control processor 210*a* can calculate the delta between the temperature value and the ambient temperature value by subtracting the two values.

The television receiver 200 can compare the temperature delta value with a predetermined upper temperature delta threshold value and with a predetermined lower temperature delta threshold value. Threshold values can be stored in the storage medium 225. For example, home automation settings database 247 can contain the predetermined upper temperature delta threshold value and predetermined lower temperature delta threshold value, which can be entered into the home automation settings database 247 upon installation of the HVAC health monitoring system 300. The threshold values can be automatically configured and stored upon installation of the HVAC health monitoring system 300, for example, by downloading the appropriate values from the television service provider system 110. In some embodiments, the threshold values can be calculated based on a known good temperature value, which is described in more detail with respect to FIG. 7.

In some embodiments, there may be multiple upper temperature delta threshold values and multiple predetermined lower temperature delta threshold values. For example, if the air conditioner 520 were being evaluated, the upper and lower temperature delta threshold values can be lower than if the furnace 510 were being evaluated.

Additionally, there may be an upper temperature delta threshold to indicate that the temperature emitting from the HVAC system 500 is elevated due to a dirty furnace filter. For example, if the furnace filter were dirty, the air would be unable to flow as quickly past the filter. Therefore, the air may be exposed to the furnace heat source longer. As a result, the air emitting from the HVAC system 500 can have an elevated temperature, resulting in an elevated temperature delta value. Therefore, there can be a dirty furnace filter upper temperature delta threshold value.

There may also be a lower temperature delta threshold value that correlates to a pilot light failure. If, for example, the pilot light has failed, the furnace 510 may not heat the air and the temperature of the air emitting from the HVAC system 500 would be much lower than if the pilot light had not failed.

In some embodiments, when the temperature delta value is below the upper temperature delta threshold and above the lower temperature delta threshold, there is an indication that the temperature delta value is acceptable. An acceptable temperature delta value may indicate that the HVAC system 500 is running properly or that there may be no errors with the HVAC system 500.

The television receiver 200 can compare the airflow value with a predetermined upper airflow threshold value and with a predetermined lower airflow threshold value. Threshold values can be stored in the storage medium 225. For example, home automation settings database 247 can contain the predetermined upper airflow threshold value and predetermined lower airflow threshold value, which can be entered into the home automation settings database 247 upon installation of the HVAC health monitoring system 300. The threshold values can be automatically configured and stored upon installation of the HVAC health monitoring system 300, for example, by downloading the appropriate values from the television service provider system 110. In some embodiments, the threshold values can be calculated based on a known good airflow value, which is described in more detail with respect to FIG. 7.

In some embodiments, there may be multiple upper airflow threshold values and multiple predetermined lower airflow threshold values. For example, if the air conditioner 520 were being evaluated, the upper and lower airflow threshold values may be different than if the furnace 510 were being evaluated.

Additionally, there may be a lower airflow threshold to indicate that the pressure emitting from the HVAC system 500 is decreased or very low because the HVAC system 500 is not actively running For example, if the HVAC system 500 were not actively running, the fan on the HVAC system may not be operating. Without the fan on the HVAC system 500 to force the air through the HVAC duct 345, the airflow value would be very low. Therefore, there may be a lower airflow threshold value that indicates the HVAC system 500 is not actively running There may also be a lower airflow threshold value that correlates to a degraded furnace filter. If, for example, the furnace filter is degraded, the air flow through the filter may be impeded. Therefore, the pressure of the air emitting from the HVAC system 500 may be lower than if the filter were not degraded. As such, a lower airflow threshold value can be implemented that indicates a degraded furnace filter.

In some embodiments, when the airflow value is below the upper airflow threshold and above the lower airflow threshold, there is an indication that the airflow value is acceptable. An acceptable airflow value may indicate that the HVAC system 500 is running properly or that there may be no errors related to the HVAC system 500.

The television receiver 200 can identify, based on at least one of the comparing the temperature delta value to the temperature delta thresholds and the comparing the airflow value to the airflow thresholds, an error with the HVAC system 500.

For example, in some embodiments, the error with the HVAC system can be identified as a degraded filter. As discussed above, there may be lower airflow threshold value that indicates a degraded filter and an upper temperature delta threshold that indicates a degraded filter. If the comparison of the airflow value with the lower airflow threshold value indicates a degraded filter and the comparison of the temperature delta value with the upper temperature delta threshold value indicates a degraded filter, the television receiver 200 can identify the HVAC system error as a degraded filter.

As another example, in some embodiments, the error with the HVAC system can be identified as a pilot light failure. As discussed above, the airflow value may be an acceptable value, falling below the upper airflow threshold and above the lower airflow threshold. Also, there may be a lower temperature delta threshold value that indicates a pilot light failure. If the comparison of the temperature delta value with the lower temperature delta threshold indicates a pilot light failure and the airflow value is an acceptable value, the television receiver 200 can identify the HVAC system error as a pilot light failure.

In some embodiments, television receiver 200 can also receive notification from the HVAC system 500 whether the HVAC system 500 is actively running, whether the furnace 510 is actively running, and/or whether air conditioner 520 is actively running In such embodiments, television receiver 200 can determine there is an HVAC system failure (e.g., furnace 510 failure and/or air conditioner 520 failure) based on the airflow value being very low. If, for example, the television receiver 200 receives an indication from HVAC system 500 is actively running, but the airflow value is at or near zero (0), the airflow value is indicating that the HVAC system is not actively running In such embodiments, the television receiver 200 can identify the error as an HVAC system failure.

In some embodiments, the error can be identified based on a trend. For example, the television receiver can use the temperature and pressure values that have been received, and in some embodiments stored in a storage device, to see that the pressure value has been rising or decreasing over time and/or that the temperature value has been rising or decreasing over time. For example, a degraded filter can be noted when the airflow value has fallen slowly over a period of time.

The television receiver 200 can send a notification of the error to a user (e.g., a warning). In some embodiments, the user can be the homeowner or a resident of the premises. In some embodiments, the user can be any other user responsible for the maintenance of house 530 or the premises in which the HVAC system 500 is included. The notification can include an alert notifying the user that there is an error, what type of error the HVAC system is experiencing, and/or remedial steps to take in response to the error. For example, if the error identified is a degraded filter, the television receiver 200 can send a notification to the user stating that there is an error, that the error is the result of a degraded filter, and/or that the user should replace the filter. In some embodiments, the notification can be sent, for example, via email, text, and/or displayed on a television in house 530.

As another example, in some embodiments, if the error identified is a pilot light failure, the television receiver 200 can send a notification to the user stating that there is an error, that the error is the result of a pilot light failure, and/or that the user should relight the pilot.

Figure 7:
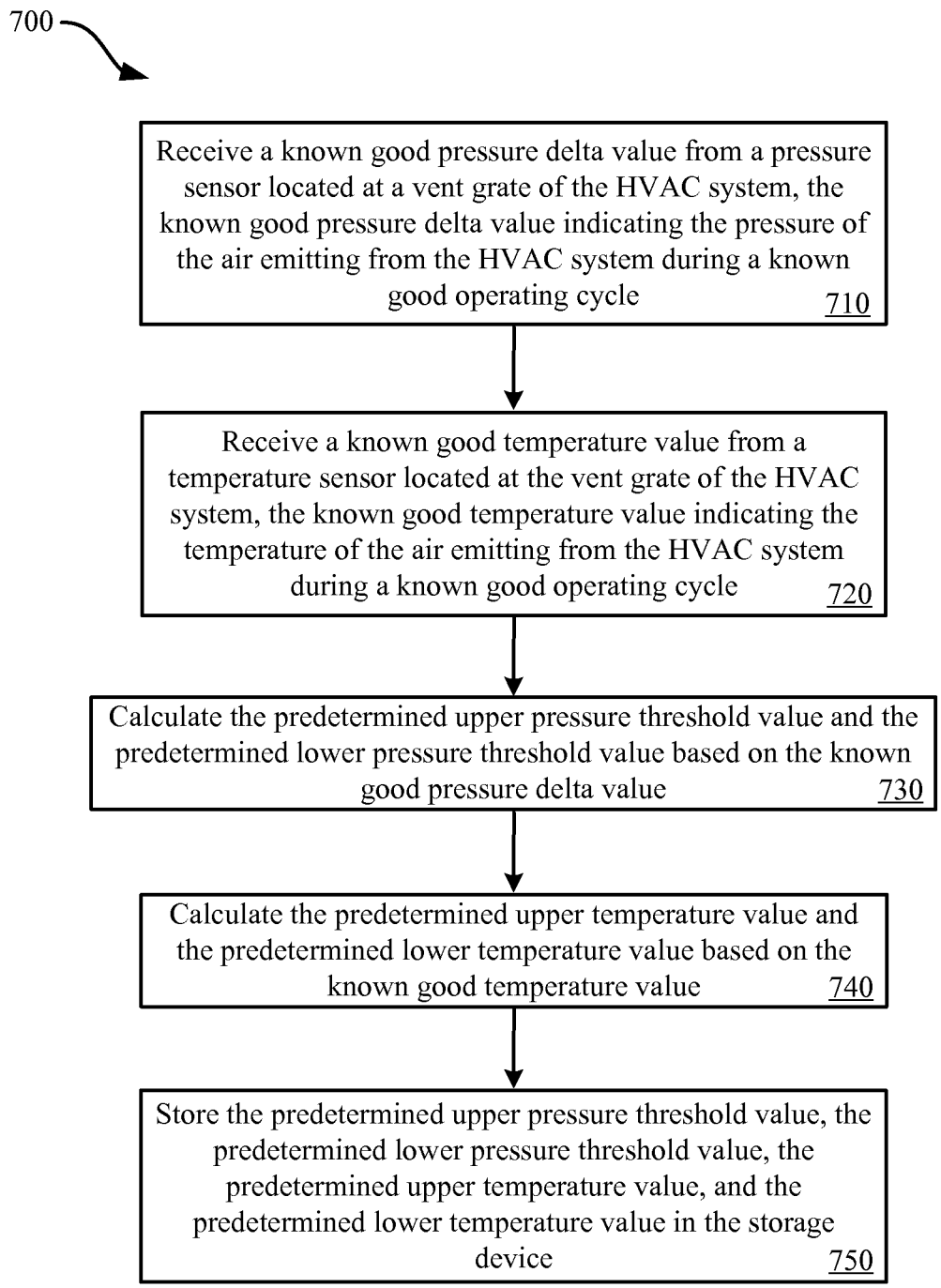
FIG. 7 illustrates an embodiment of another method for using an HVAC health monitoring system.

FIG. 7 illustrates another embodiment of a method 700 for using an HVAC health monitoring system, such as HVAC health monitoring system 300 (FIG. 3). The method will be described in relation to the system components described above with respect to FIGS. 3-5. While the embodiments and system components described with respect to FIGS. 3-5 are an embodiment of the present invention, other embodiments and components can be used to complete the method illustrated in FIG. 7.

An electronic device, such as the television receiver 200 shown in FIG. 2 can be used to complete method 700. For example, the television receiver 200 can receive a known good airflow value from pressure sensor 335 located at vent grate 315. An airflow value can be a known good airflow value when the measurement is taken during a known good cycle of the HVAC system 500. For example, when the HVAC system 500 is serviced, it is in a known good state. The HVAC serviceman or the homeowner can utilize a user interface, for example through the television, to calibrate the HVAC health monitoring system 300. For example, the user interface can allow the user to set the HVAC health monitoring system 300 to measure the airflow value at pressure sensor 335, and once television receiver 200 receives the airflow value television receiver 200 can mark the airflow value as a known good airflow value. In some embodiments, the control processor 210a of the television receiver 200 can store the known good airflow value in the storage medium 225. In some embodiments, the television receiver 200 can self-calibrate the HVAC health monitoring system 300. For example, in some embodiments, the television receiver 200 can recognize that after receiving multiple (e.g., 10) airflow values that are acceptable values (i.e., below the upper airflow threshold and above the lower airflow threshold), the television receiver 200 can determine that the HVAC system 500 is in a known good state. The television receiver 200 can then use the next received airflow value as the known good airflow value. In some embodiments, there may be more than one known good airflow value. For example, the known good airflow value may be different when the furnace 510 is actively running than when the air conditioner 520 is actively running In such embodiments, the multiple known good values can be marked accordingly in, for example, the home automation settings database 247. For example, the database can include fields for the known good airflow values that correlate to the active operation of the furnace 510 or the air conditioner 520 as well as information about when the known good value was captured including date, time, and method (e.g., self-captured or through the user interface).

The television receiver 200 can also receive a known good temperature value from temperature sensor 330 located at vent grate 315. A temperature value can be a known good temperature value when the measurement is taken during a known good cycle of the HVAC system 500. For example, when the HVAC system 500 is serviced, it is in a known good state. The HVAC serviceman or the homeowner can utilize a user interface, for example through the television, to calibrate the HVAC health monitoring system 300. For example, the user interface can allow the user to set the HVAC health monitoring system 300 to measure the temperature at temperature sensor 330, and once television receiver 200 receives the temperature value television receiver 200 can mark the temperature value as a known good temperature value. In some embodiments, the control processor 210a of the television receiver 200 can store the known good temperature value in the storage medium 225. In some embodiments, the television receiver 200 can self-calibrate the HVAC health monitoring system 300. For example, in some embodiments, the television receiver 200 can recognize that after receiving multiple (e.g., 10) temperature values that are acceptable values (i.e., below the upper temperature delta threshold and above the lower temperature delta threshold), the television receiver 200 can determine that the HVAC system 500 is in a known good state. The television receiver 200 can then use the next received temperature value as the known good temperature value. In some embodiments, there may be more than one known good temperature value. For example, the known temperature value may be different when the furnace 510 is actively running than when the air conditioner 520 is actively running In such embodiments, the multiple known good values can be marked accordingly in, for example, the home automation settings database 247. For example, the database can include fields for the known good temperature values that correlate to the active operation of the furnace 510 or the air conditioner 520 as well as information about when the known good value was captured including date, time, and method (e.g., self-captured or through the user interface).

The television receiver 200 can calculate the predetermined upper airflow threshold value and predetermined lower airflow threshold value based on the known good airflow value. As discussed above, there may be multiple upper airflow threshold values and lower airflow threshold values. The television receiver 200 can calculate the lower airflow threshold value, for example, by subtracting a certain pressure value from the known good value which indicates certain types of errors. For example, if a certain pressure decrease (e.g., 2 psi) indicates a degraded filter, the control processor 210a can subtract that pressure from the known good value and use the result as the lower airflow threshold value for degraded filter errors. Similarly the television receiver 200 can calculate the upper airflow threshold value by adding a certain pressure value to the known good value to indicate certain types of errors.

The television receiver 200 can calculate the predetermined upper temperature delta threshold value and the predetermined lower temperature delta threshold value based on the known good temperature value. As discussed above, there may be multiple upper temperature delta threshold values and lower temperature delta threshold values. The television receiver 200 can calculate the lower temperature delta threshold value, for example, by adding a certain temperature value to the known good value which indicates certain types of errors. For example, if a certain temperature increase (e.g., 5 degrees) indicates a degraded filter, the control processor 210a can add that temperature to the known good value and use the result as the upper temperature delta threshold value for degraded filter errors. Similarly the television receiver 200 can calculate the lower temperature delta threshold value by subtracting a certain temperature value from the known good value to indicate certain types of errors.

The television receiver 200 can store the predetermined upper airflow threshold value, the predetermined lower airflow threshold value, the predetermined upper temperature delta threshold value, and the predetermined lower temperature delta threshold value in the storage device. In some embodiments, the control processor 210a of the television receiver 200 can store the threshold values in the storage medium 225. In such embodiments, for example, the values can be stored in the home automation settings database 247. The database 247 can include fields for the threshold values that correlate to the active operation of the furnace 510 or the air conditioner 520 as well as information about the type of threshold it is correlated to (e.g., pilot light failure, HVAC system failure, etc.).

Figure 8:
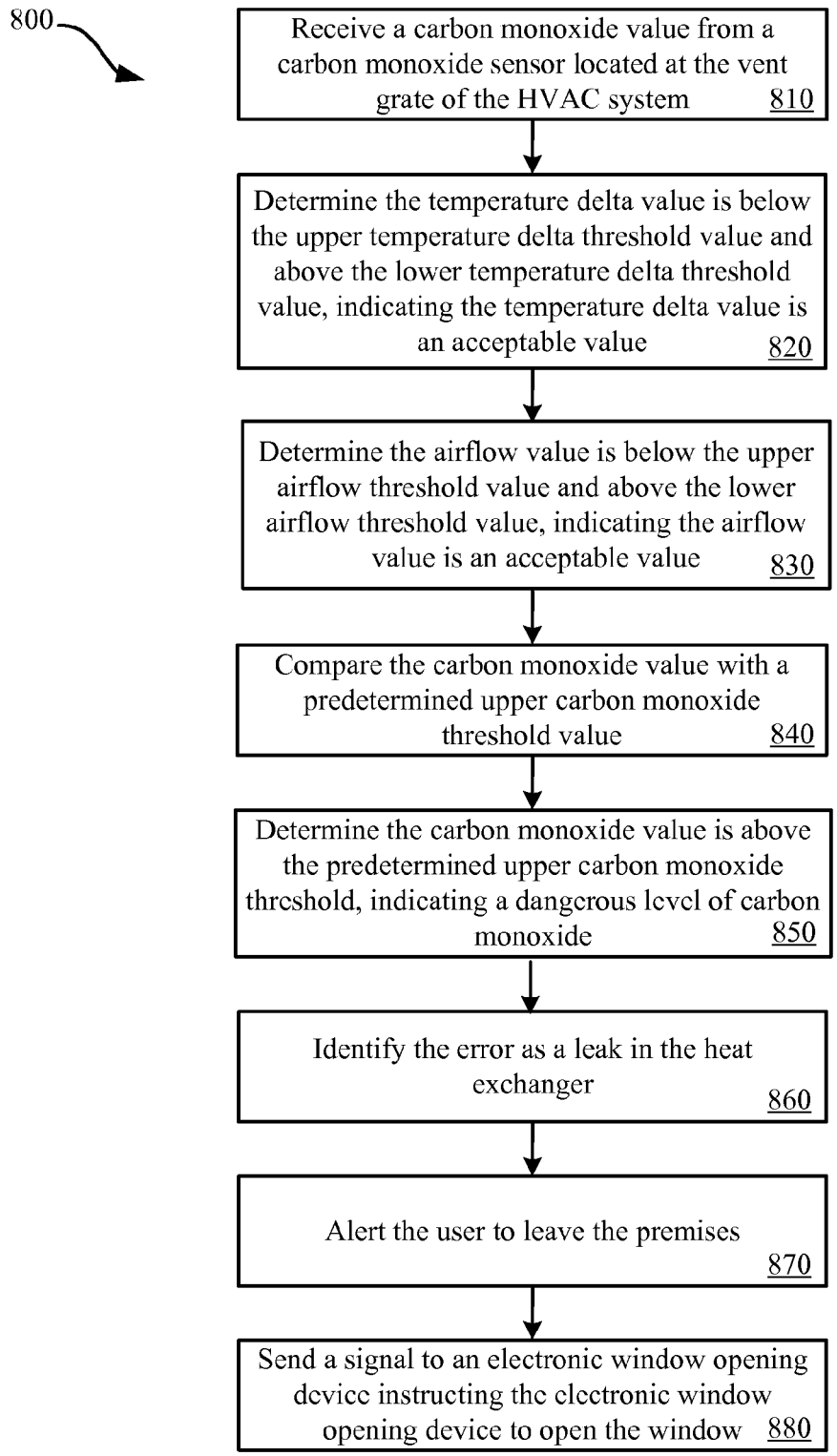
FIG. 8 illustrates an embodiment of another method for using an HVAC health monitoring system.

FIG. 8 illustrates another embodiment of a method 800 for using an HVAC health monitoring system, such as HVAC health monitoring system 300 (FIG. 3). The method will be described in relation to the system components described above with respect to FIGS. 3-5. While the embodiments and system components described with respect to FIGS. 3-5 are an embodiment of the present invention, other embodiments and components can be used to complete the method illustrated in FIG. 8.

An electronic device, such as the television receiver 200 shown in FIG. 2 can be used to complete method 800. For example, at 810, the television receiver 200 can receive a carbon monoxide value from a carbon monoxide sensor 325 located at vent grate 315 of HVAC system 500. More specifically, for example, the carbon monoxide sensor 325 can obtain the carbon monoxide value while HVAC system 500 is actively running In some embodiments, carbon monoxide sensor 325 can obtain the carbon monoxide value while HVAC system 500 is not actively running The carbon monoxide value can be communicated to the HVAC health monitoring device 340 through the wired connection located in tubing 350 that couples the carbon monoxide sensor 325 and HVAC health monitoring device 340. HVAC health monitoring device 340 can wirelessly transmit the carbon monoxide value to the network interface 220 of the television receiver 200 via, for example, ZigBee®.

At 820, the television receiver 200 can determine the temperature delta value is below the upper temperature delta threshold value by comparing the temperature delta value with the upper temperature delta threshold value. The television receiver 200 can also determine the temperature delta value is above the lower temperature delta threshold value by comparing the temperature delta value with the lower temperature delta threshold value. The television receiver 200 can determine that the temperature delta value falls within the acceptable region and that the temperature delta value is an acceptable value.

At 830, the television receiver 200 can determine the airflow value falls within the acceptable region for the airflow thresholds and that the airflow value is an acceptable value similarly to how it determined the temperature delta value is an acceptable value.

At 830, the television receiver 200 can compare the carbon monoxide value with a predetermined upper carbon monoxide threshold value. The predetermined upper carbon monoxide threshold value can be stored in a storage device, such as, for example, home automation settings database 247. The predetermined upper carbon monoxide threshold value can be entered into the home automation settings database 247 upon installation of the HVAC health monitoring system 300. The upper carbon monoxide threshold value can be automatically configured and stored upon installation of the HVAC health monitoring system 300, for example, by downloading the appropriate value from the television service provider system 110.

At 850, the television receiver 200 can determine that the carbon monoxide value is above the predetermined upper carbon monoxide threshold. A carbon monoxide value that exceeds the predetermined upper carbon monoxide threshold can indicate a dangerous level of carbon monoxide. A carbon monoxide value that exceeds the predetermined upper carbon monoxide threshold can indicate a leak in the heat exchanger of the furnace in HVAC system 500.

At 860, the television receiver 200 can identify the HVAC system 500 error as a leak in the heat exchanger based on the carbon monoxide value exceeding the upper carbon monoxide threshold and the temperature delta value being acceptable values.

At 870, the television receiver 200 can send a notification of the error to a user. In some embodiments, the user can be the homeowner. In some embodiments, the user can be any other user responsible for the maintenance of house 530 or the premises in which the HVAC system 500 is included.

The notification can include an alert notifying the user that there is an error, what type of error the HVAC system is experiencing, and/or remedial steps to take in response to the error. The television receiver 200 can send a notification to the user, for example, that the error is a leak in the heat exchanger, the notification to the user can also include an alert to leave the premises (e.g., house 530) because the carbon monoxide levels are dangerous.

In some embodiments, the notification can be sent by displaying the notification on a display device. For example, television receiver 200 can output the notification to display device 160, thereby notifying the homeowner. In some embodiments, television receiver 200 can detect whether the display device 160 is on, and send the notification to display device 160 only if display device 160 is powered on. If display device 160 is powered off, the notification can be sent to the user or homeowner via an alternative method, such as, for example, via the user's mobile device. In some embodiments, if the display device 160 is powered off, the television receiver 200 can power the display device 160 on and output the notification to display device 160.

In some embodiments, the notification can be sent by the electronic device to the homeowner's mobile device via text message or automated phone call. For example, television receiver 200 can communicate via network interface 220 with the user or homeowner's cellular phone by sending a text message or making an automated call and if necessary leaving an automated voicemail. If, for example, television receiver 200 detects that the homeowner is not in the house 530 (perhaps, for example, via motion sensors that are installed as part of a home automation system), television receiver 200 can send the notification to the homeowner via the homeowner's mobile device. In some embodiments, the television receiver 200 may be able to detect which room the homeowner is in and turn on a display device 160 in the appropriate room occupied by the homeowner to display the notification on.

In some embodiments, the notification can be sent differently, according to predetermined settings, based on time of day and/or type of error. For example, if the detected error is not urgent (e.g., degraded filter) and/or it is late at night (e.g. 2 am) the television receiver 200 can send the notification to display device 160 next time the user or homeowner powers display device 160 on. As another example, if the detected error is very urgent (e.g., a leak in the heat exchanger resulting in elevated carbon monoxide levels), regardless of time of day, the television receiver can, for example, power some or all display devices 160 in house 530 on and display the notification and/or send the notification to the user/homeowner via text and/or phone call and/or notify the fire department of the error.

In some embodiments, the electronic device can notify the authorities as appropriate. For example, the electronic device (e.g., television receiver 200) can communicate with the police department and/or fire department when, for example, an elevated carbon monoxide value is detected.

At 880, in some embodiments, the television receiver 200 can send a signal to an electronic window opening device instructing the electronic window opening device to open the window. For example, television receiver 200 can send a signal to electronic window opening device 410 to open window 420.

Figure 9:
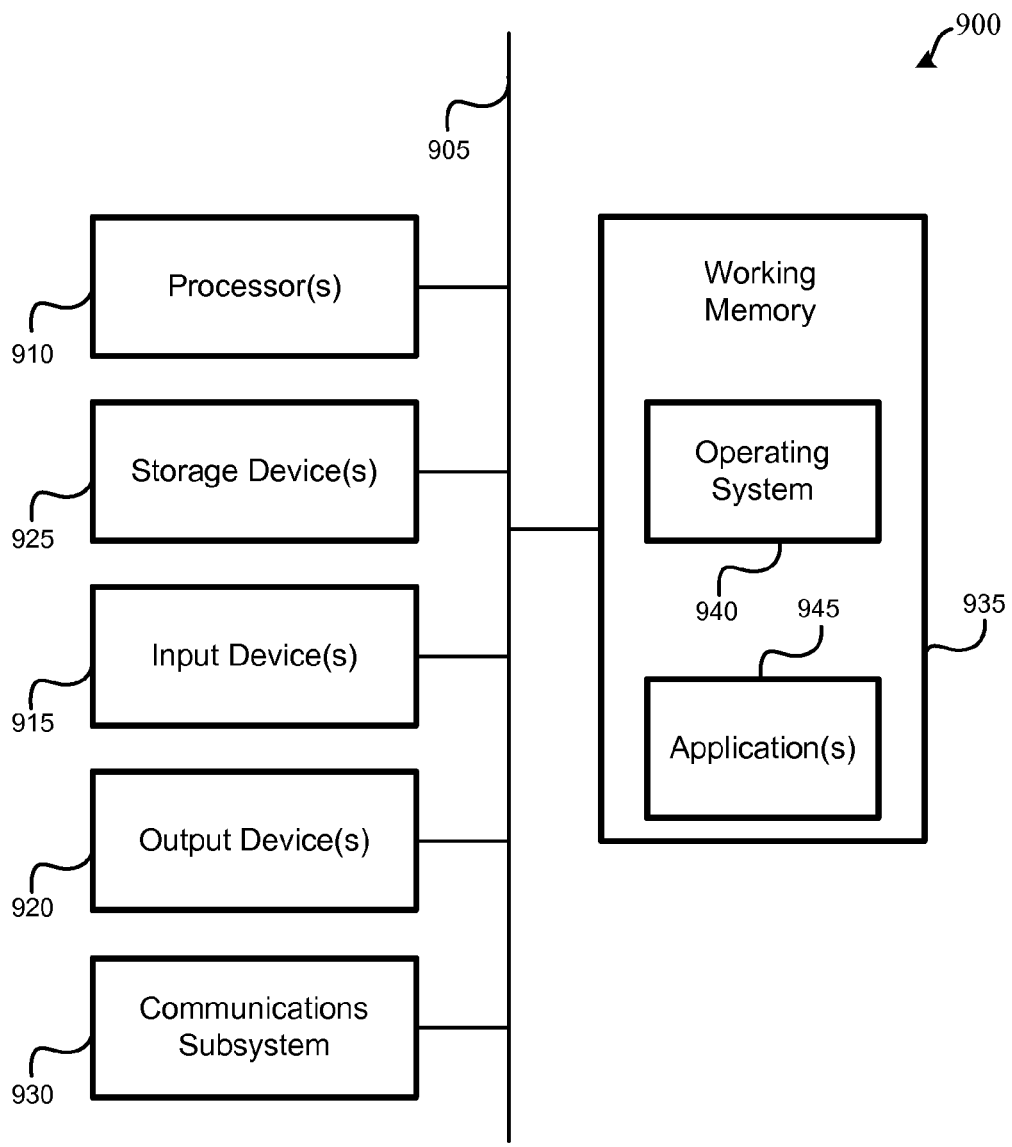
FIG. 9 illustrates an embodiment of a computer system.

FIG. 9 illustrates an embodiment of a computer system 900. A computer system 900 as illustrated in FIG. 9 may be incorporated into devices such as an STB, a first electronic device, DVR, television, media system, personal computer, and the like. Moreover, some or all of the components of the computer system 900 may also be incorporated into a portable electronic device, mobile phone, or other device as described herein. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into the computer system 900, e.g., an electronic device or STB, as an input device 915. In many embodiments, the computer system 900 will further comprise a working memory 935, which can include a RAM or ROM device, as described above.

The computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, 7 or 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium.

Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method comprising:
    determining, at a television receiver of a home automation system, a predetermined temperature delta threshold value and a predetermined airflow threshold value for a Heating, Ventilation, and Air Conditioning (HVAC) system;
    storing, by the television receiver, the predetermined temperature delta threshold value and the predetermined airflow threshold value in a home automation settings database;
    receiving, at the television receiver, a signal from the HVAC system indicating that the HVAC system is actively running;
    receiving, at the television receiver while the HVAC system is actively running, a temperature value from a temperature sensor located at a vent grate of the HVAC system, the temperature value indicating a temperature of the air emitting from the HVAC system;
    receiving, at the television receiver while the HVAC system is currently running, an airflow value from a pressure sensor located at the vent grate of the HVAC system, the airflow value determined by a pressure of the air emitting from the HVAC system;
    calculating, at the television receiver, a temperature delta value based on the temperature value and an ambient temperature value;
    comparing, at the television receiver, the temperature delta value with the predetermined temperature delta threshold value;
    comparing, at the television receiver, the airflow value with the predetermined airflow threshold value;
    identifying, by the television receiver, an error with the HVAC system, the identifying the error comprising:
        determining, by the television receiver, that the airflow value is an acceptable value based on comparing the airflow value to the predetermined airflow threshold value,
        determining, by the television receiver, that the temperature delta value is below the predetermined temperature delta threshold value, wherein the predetermined temperature delta threshold value indicates a pilot light failure, and
        identifying, by the television receiver, that the error with the HVAC system is a pilot light failure based on the determining that the airflow value is an acceptable value and determining that the temperature delta value is below the predetermined temperature delta threshold value; and
    sending, by the television receiver, a notification of the error to a device of a user alerting the user that the error with the HVAC system is a pilot light failure and instructing the user to relight the pilot light.

2. The method of claim 1, further comprising:
    receiving, at the television receiver, a known good airflow value from the pressure sensor located at the vent grate of the HVAC system, the known good airflow value determined by the pressure of the air emitting from the HVAC system during a known good operating cycle;
    receiving, at the television receiver, a known good temperature value from the temperature sensor located at the vent grate of the HVAC system, the known good temperature value indicating the temperature of the air emitting from the HVAC system during a known good operating cycle;
    calculating, by the television receiver, the predetermined airflow threshold value based on the known good airflow value; and
    calculating, by the television receiver, the predetermined temperature delta threshold value based on the known good temperature value.

3. The method of claim 1, wherein the notification is displayed on a television.

4. The method of claim 1, wherein the temperature sensor is a first temperature sensor, the method further comprising:
    receiving, at the television receiver, the ambient temperature value from a second temperature sensor located at the vent grate of the HVAC system.

5. The method of claim 1, further comprising:
    receiving, at the television receiver, the predetermined temperature delta threshold value and the predetermined airflow threshold value from a television service provider.

6. A system, comprising:
    a temperature sensor, the temperature sensor being located in a vent grate of a Heating, Ventilation, and Air Conditioning (HVAC) system and configured to measure a temperature of air emitting from the HVAC system;
    a pressure sensor, the pressure sensor being located in the vent grate of the HVAC system and configured to measure a pressure differential of air emitting from the HVAC system;
    a storage device; and
    a television receiver of a home automation system communicatively coupled to the temperature sensor, the pressure sensor, and the storage device, the television receiver comprising:
        one or more processors; and
        memory communicatively coupled with and readable by the one or more processors and having stored therein processor-readable instructions which, when executed by the one or more processors, cause the one or more processors to:
            determine a predetermined temperature delta threshold value and a predetermined airflow threshold value;
            storing the predetermined temperature delta threshold value and the predetermined airflow threshold value in the storage device;

receive a signal from the HVAC system indicating that the HVAC system is actively running;

receive a temperature value from the temperature sensor while the HVAC system is actively running;

receive an airflow value from the pressure sensor while the HVAC system is actively running;

calculate a temperature delta value based on the temperature value and an ambient temperature value;

compare the temperature delta value with a predetermined temperature delta threshold value, wherein the predetermined temperature delta threshold value is stored in the storage device;

compare the airflow value with a predetermined airflow threshold value, wherein the predetermined airflow threshold value is stored in the storage device;

identify an error with the HVAC system, the identifying the error comprising:
- determine that the airflow value is an acceptable value based on comparing the airflow value to the predetermined airflow threshold value,
- determine that the temperature delta value is below the predetermined temperature delta threshold value, wherein the predetermined temperature delta threshold value indicates a pilot light failure, and identify that the error with the HVAC system is a pilot light failure based on determining that the airflow value is an acceptable value and determining that the temperature delta value is below the predetermined temperature delta threshold value; and send a notification of the error to a device of a user alerting the user that the error with the HVAC system is a pilot light failure and instructing the user to relight the pilot light.

7. The system of claim 6, wherein the memory further has stored therein processor-readable instructions which, when executed by the one or more processors, cause the one or more processors to:
- receive a known good airflow value from the pressure sensor located at the vent grate of the HVAC system, the known good airflow value determined by a pressure of the air emitting from the HVAC system during a known good operating cycle;
- receive a known good temperature value from the temperature sensor located at the vent grate of the HVAC system, the known good temperature value indicating a temperature of the air emitting from the HVAC system during a known good operating cycle;
- calculate the predetermined airflow threshold value based on the known good airflow value; and
- calculate the predetermined temperature delta threshold value based on the known good temperature value.

8. The system of claim 6, wherein the notification is displayed on a television.

9. The system of claim 6, wherein the temperature sensor is a first temperature sensor, and wherein the memory further has stored therein processor-readable instructions which, when executed by the one or more processors, cause the one or more processors to:
- receive the ambient temperature value from a second temperature sensor located at the vent grate of the HVAC system.

* * * * *